United States Patent Office 3,165,995
Patented Jan. 19, 1965

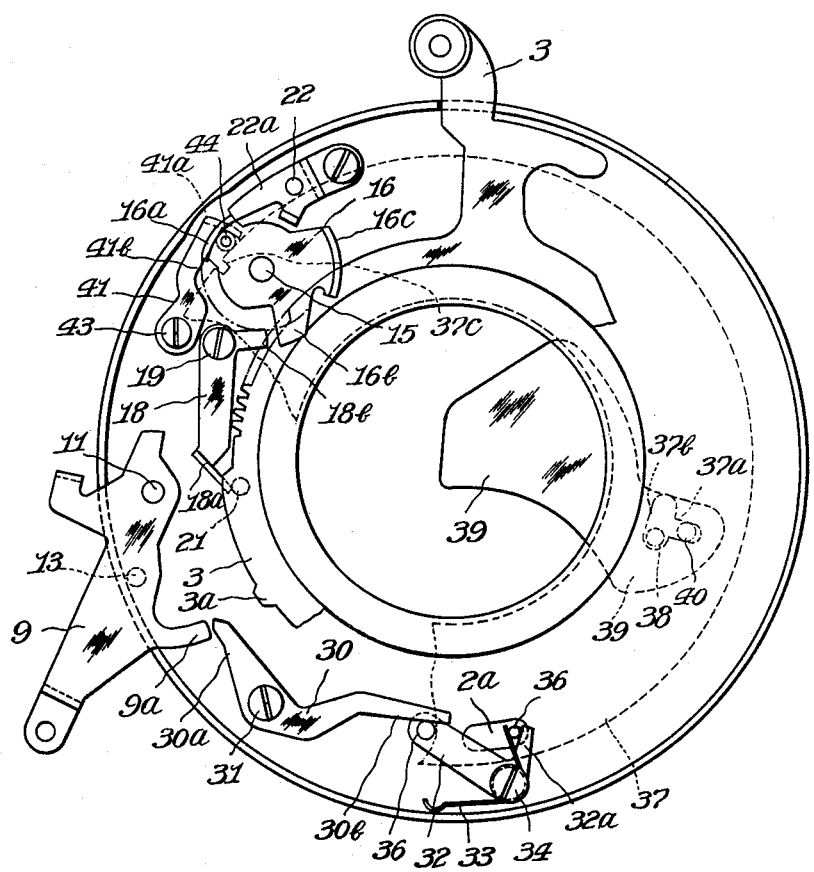

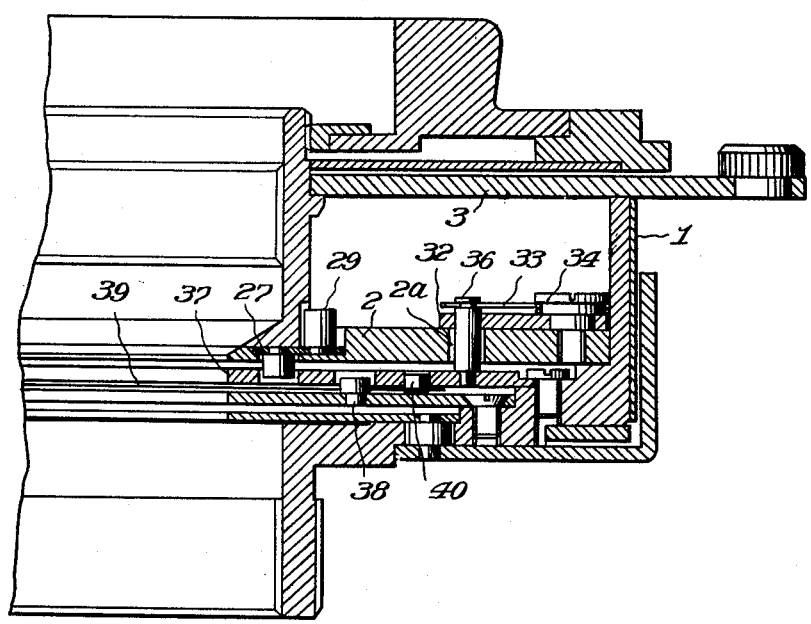

3,165,995
LENS SHUTTER
Naoyuki Ohara, Soshigaya, Setagaya-ku, Tokyo-to, Japan, assignor to Kabushiki Kaisha Hattori Tokeiten (also known as K. Hattori & Co. Ltd.), Tokyo, Japan
Filed July 31, 1961, Ser. No. 128,242
Claims priority, application Japan, Aug. 3, 1960, 33,486/60
1 Claim. (Cl. 95—63)

This invention relates to lens shutters for photographic cameras, and more particularly, it relates to a shutter having an additional set of shutter blades which is installed independently of the shutter blades for normal exposure operation, and which is used for the purpose of cutting off light rays tending to pass through the shutter even when the shutter is in its closed condition.

It is an object of this invention to provide a new and improved lens shutter for cameras which is capable of performing positive and accurate screening action.

It is another object of this invention to provide a shutter as stated above wherein blades for preventing light leakage (hereinafter called screening blades) are in a closed condition together with the shutter blades when the latter are closed, are moved into the opened condition in interrelated motion with the shutter release lever prior to the opening and closing operation of the shutter blades, maintaining said opened condition until the shutter is closed, and the operator's hand is removed from the release lever, or until the shutter closure is completed even when the hand is already removed from the release lever, and automatically close after the foregoing shutter operation; requiring no special manipulative operation whatsoever for the additional screening and no additional mechanism on the outer portion of the shutter assembly.

It is yet another object of this invention to provide a shutter wherein the action of the said screening blades has no practical influence whatsoever on the actual exposure operation and the exposure time.

It is a further object of this invention to provide a shutter which has especially superior light shutting-off characteristic, without the necessity of additional mechanism, not only for cameras using photosensitive materials of high sensitivity, but also in the case of cameras of the type equipped with shutters in the so-called behind position. (Many cameras of this type have interchangeable lenses, and the probability of the shutter being exposed directly to intense light rays is high.)

It is a still further object of the invention to provide a shutter which possesses the various advantageous features stated above, and which, nevertheless, has a simple construction which can be easily and economically fabricated.

Said objects and other objects of this invention have been attained by a lens shutter for photographic cameras, having shutter blades for effecting ordinary exposure operation and screening blades which are installed independently of and separately from the said shutter blades, and which are used for the purpose of shutting off light rays tending to infiltrate through the shutter even when the shutter is closed, and so constructed that the said screening blades are closed together with the said shutter blades when the latter are closed, move interrelatedly with the release lever of the camera, prior to the exposure operation, to their opened condition, and are locked by a latching means in the said condition, being maintained in the said condition until, subsequently, the shutter is released, and the exposure operation is completed; and, upon completion of the exposure operation, a master member for exposure operation which has a center of rotation located at a point not on the optical axis of the shutter unlatches the aforesaid latching means, thereby releasing the said screening blades to return to their closed condition.

The manner in which the foregoing objects and accompanying advantages of the invention may best be achieved will be more clearly apparent by reference to the following detailed description taken in conjunction with the accompanying illustrations of one embodiment of the invention in which the same and equivalent parts are designated by the same reference numerals and letters, and in which:

FIG. 4 is a front elevational view of the embodiment of FIG. 1, showing particularly the condition wherein the additional screening blades are again closed;

FIG. 5 is an elevational view, in section, taken along a vertical plane passing through the optical axis, showing the construction and arrangement of the embodiment shown in FIG. 1.

Figure 1:
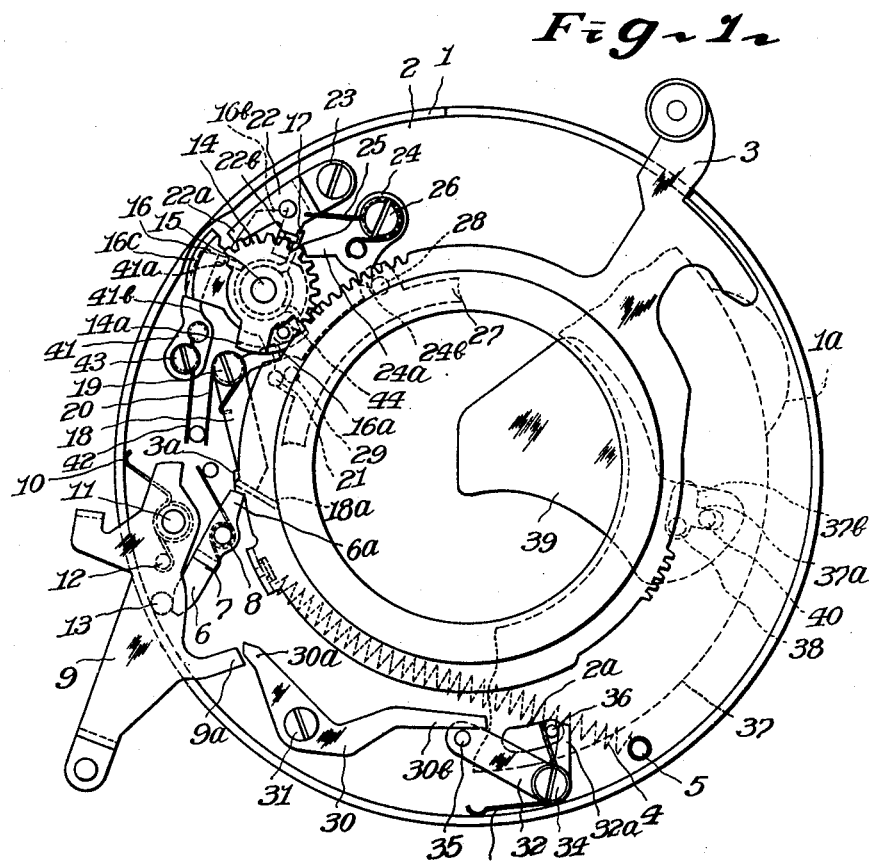
FIG. 1 is a front elevational view of one embodiment of the invention, showing its construction and operation, particularly for the case wherein the shutter is in the cocked or charged condition, and the additional screening blades are in the closed condition.
Figure 2:
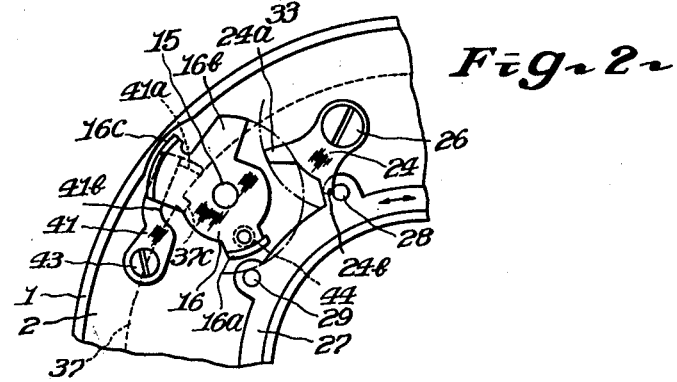
FIG. 2 is a partial front elevational view of the embodiment shown in FIG. 1, showing particularly the parts which are not easily understood in the view of FIG. 1, principally the main operating device.

Referring to FIGS. 1 and 2, the shutter frame structure is formed from a shutter case 1 and a base plate 2, on which the moving parts of the shutter are assembled. A cocking lever 3 of ring shape encompasses an opening of the base plate 2 and has a portion extending to the outside of the shutter case 1. A spring 4 imparts an elastic force tending to rotate the cocking lever 3 in the counterclockwise direction and is anchored at its fixed and on a stud 5 which is firmly fixed on the base plate 2. A latching pawl 6, for holding the cocking lever 3 in its cocked condition, is caused by the torque due to a spring 7 to be elastically forced in the clockwise direction about a shaft 8, being engaged by its extreme end 6a with the nose portion 3a of the cocking lever 3. A shutter release lever 9, which is supported rotatably on a shaft 11, is caused by the torque due to a spring 10 to have elastic force in the clockwise direction and has a portion which extends to the outside of the shutter casing 1. The fixed end of the spring 10 is anchored on a stud 12. A pin 13 is provided to push the latching pawl 6 so as to disengage the extreme end 6a from the nose portion 3a, thereby accomplishing shutter release, and also has the function of a stopper for preventing the release lever 9 from rotating excessively in either direction. A pinion 14, which rotates about a shaft 15, is meshed with the gear teeth 3b cut on the outer periphery of the cocking lever 3 and cocks or charges the main operating device of the shutter. A master member 16, which is supported coaxially as the pinion 14 and has a rising portion 16a and an arm 16b, is a main driving member which effects the opening and closing action of the shutter. The portion designated by 16c is for a shutter speed control governor and description thereof will here be omitted since it does not have a direct relation to the present invention. An arm 14a of the pinion 14 engages with the rising portion 16a of the master member 16 and has a one-way coupling engagement. One end of a main spring 17 is fixed to a portion of the rising portion 16a of the master member 16 so as to rotate the master member 16 in the clockwise direction. A latching member 18 for maintaining the master member 16 in its charged condition is supported pivotally on a screw 19 and has an elastic force imparted thereto by a spring 20 tending to rotate it in the counterclockwise direction. The latching member 18 has a lug portion 18b which holds one portion of the rising portion 16a of the master member 16 and a portion 18a for engaging, during the release operation, with a pin 21 embedded at one end in the cocking lever 3. A stopper 22, which is fastened by a screw 23 on the base plate 2, for the master member 16 functions also as a member for supporting the fixed end of the main spring 17 and has a stop portion 22a and a spring anchoring portion 22b. An intermediate lever 24 for transmitting the movement of the master member 16 to a blade ring 27 is supported rotatably on a shaft 26 and is subjected to an elastic force due to a spring 25 tending to rotate it in the counterclockwise direction. An arm 24a engages with the master member 16, and an arm 24B engages with the pin 28 for the opening operation which is embedded at one end in the blade ring 27. The blade ring 27 is provided with a separate pin 29, which engages directly with the master member 16 in the blade closing operation. The blade ring 27 has a ring shape, one portion of which is shown, and has control pins (not shown) embedded therein at five positions equally spaced on the same radius, undergoing reciprocating rotation for opening and closing the shutter blades by a known method.

The aforesaid release lever 9 has an arm 9a which engages with an arm 30a of a transmitting lever 30, which is pivotally supported by a pivot screw 31 on the base plate 2 and has another arm 30B. An opening and closing lever 32 which moves additionally installed blades for preventing light leakage has a stud 35 which engages with the arm 30B and an arm 32a. A spring 33 elastically pushes the arm 32a by way of a stud 36, thereby imparting a force on the lever 32 tending to rotate it in the clockwise direction about a pivot screw 34, and also imparts, a force on the lever 30 tending to rotate it in the counterclockwise direction. An opening and closing ring 37 for the screening blades 39 functions also as a partition plate of the shutter blades (not shown) and has a ring shape. In FIG. 1, since this ring 37 is disposed on the reverse side of the base plate 2, a portion thereof is shown. The stud 36 is embedded at one end thereof in the ring 37 and projects above the upper surface of the base plate 2 through a window 2a cut out in the plate 2. Holes, each of which have portions 37a and 37b are equally spaced on equal radii at five places in the ring 37, the portion 37a being elongated in the radial direction, and the portion 37b being elongated in the circumferential direction. Reference numeral 38 designates one of five pins which are embedded in a plate (not shown). The pin 38 functions as the center of rotation of a screening blade 39, the total number of which is five. Each blade 39 has embedded therein a pin 40 which is fitted into the slot 37a of the ring 37, and which, when the ring 37 undergoes reciprocating rotation, converts the said rotation into opening and closing movement of the screening blade. The slot 37b is provided so that, during this operation, the pin 38 does not interfere with the movement of the opening and closing ring 37. The casing 1 has cut-out portions 1a at five places (only one example being shown) which provide clearance for the blades 39 when they are opened. As illustrated in FIG. 2, a notch 37c is cut out at one portion on the outer periphery of the ring 37 and is engaged by the extreme end 41a of a latching means 41, upon which an elastic force is exerted by a spring 42 tending to rotate the latching means 41 in the clockwise direction about a pivot screw 43. An arm 41b of the latching means 41 engages with a stud 44 embedded in the master member 16.

The operation of the embodiment of the above-described construction, according to the present invention, will now be described with reference to FIGS. 1 through 5. As mentioned hereinbefore, FIG. 1 illustrates an embodiment of the shutter according to the invention in its cocked condition. In this condition, the cocking lever 3 has already been moved, by hand or by a shutter cocking member of the camera body, from its normal or run-down position to the position indicated in FIG. 1 against the force of the spring 4 and is held in this condition by the locking of the nose portion 3a by the extreme end 6a of the latching pawl 6. During this operation, the cocking lever 3, through its gear teeth 3b cut on its outer periphery, causes the pinion 14 for charging to rotate about its shaft 15 in the counterclockwise direction. Since the arm 14a of the pinion 14 is engaged with the ring portion 16a of the master member 16, the said member 16 is pushed by the pinion 14 to the position shown in FIG. 1 and is locked by the lug portion 18b of the latching member 18. During this operational step, the main spring 17 is stretched, and its energy for opening and closing the shutter is being stored.

The mechanism for preventing light leakage, under the above-described condition, will now be considered. The opening and closing ring 37 for the screening blades 39 is being pressed in the counterclockwise direction about the optical axis by the force of the spring 33 acting on the stud 36 embedded in the ring 37. Since each slot 37a is fitted onto the pin 40 embedded in the corresponding blade 39 which has the pin 38 as its rotational center, the said slot 37a is holding, through the pin 40, the blade 39 in its closed position.

Thus, in the operational condition illustrated in FIG. 1, the screening blades 39 and the shutter blades (not shown) are doubly covering the central aperture of the shutter and are completely cutting off the light rays which enter through the lenses. When, under this condition, the release lever 9 is rotated in the counterclockwise direction about the shaft 11 by hand or by means of a member for release of the camera, against the force of the spring 10, the arm 9a pushes the arm 30a of the transmitting lever 30 and causes the said lever 30 to rotate in the clockwise direction about the pivot screw 31. The other arm 30b of the transmitting lever 30 pushes the stud 35 embedded in the opening and closing lever 32, thereby causing the said lever 32 to rotate in the counterclockwise direction about its shaft 34. Since the movement of this lever 32 is transmitted by way of the arm 32a and the stud 36 to cause the opening and closing ring 37 for the screening blades 39 to rotate, against the force of the spring 33, about the optical axis in the clockwise direction, the pins fitted into the slot 37a of the ring 37, that is, the pins 40 embedded in the screening blades 39, which rotate about the pins 38, are pushed, whereby the blades 39 are moved in the clockwise direction toward their opened condition. If the pushing of the release lever 9 is continued further, the blades 39 will be opened still wider until they are fully opened, whereupon the opening and closing ring 37 will reach the maximum point of its extent of movement.

Figure 3:
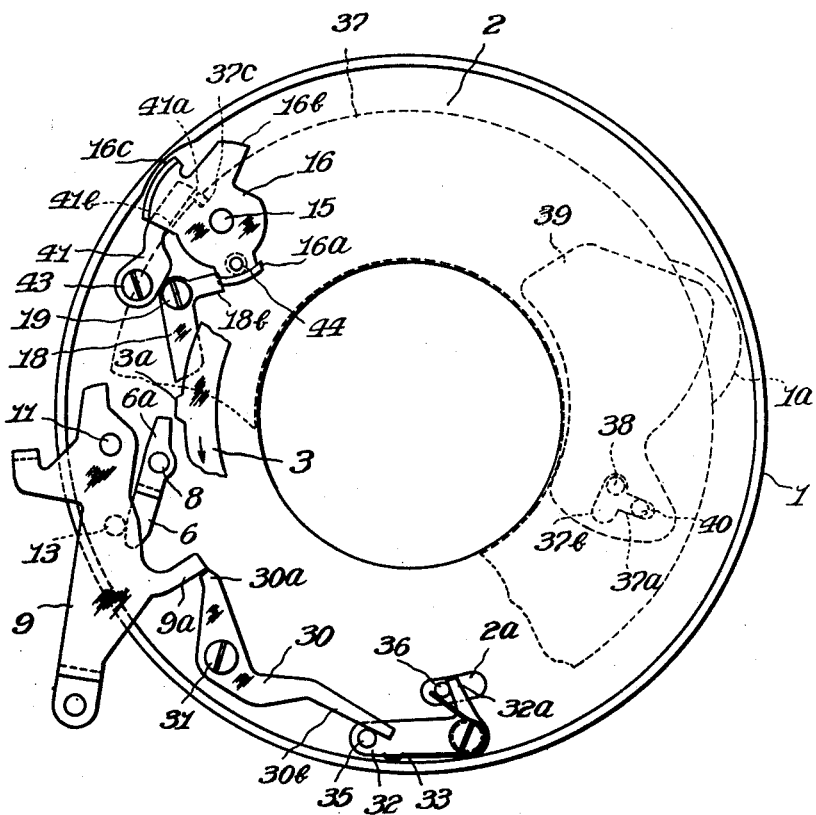
FIG. 3 is a front elevational view of the embodiment of FIG. 1, showing particularly the case wherein the additional screening blades are in the opened condition, parts which are unnecessary for the description being omitted.

The above-described condition is indicated in FIG. 3, in which the extreme end 41a of the latching means 41 has dropped into the notch 37c provided in the ring 37 and is locking the ring 37. When this condition has been attained, the ring 37 remains locked and does not move even if the operator's hand is removed from the release lever 9, and the release lever 9 returns to its original position (i.e., the position shown in FIG. 1). Accordingly, the screening blades 39 are maintained in their opened condition. During this operational step, the portion of equal radius of the arm 9a of the release lever 9 slides onto the arm 30a of the transmitting lever 30 so that, after the latching means 41 has locked into the notch 37c, the ring 37 will not move appreciably even if the release lever 9 is moved still further.

On one hand, while the release lever 9 effects the above-described operation, it also fulfills its original function of carrying out the shutter release operation. More specifically, the pin 13 embedded in the release lever 9, in accordance with the movement of the release lever 9, pushes the latching pawl 6 and causes it to rotate about its shaft 8 in the counterclockwise direction. Accordingly, the degree of engagement between the extreme end 6a of the latching pawl 6 and the nose portion 3a of the cocking lever 3 gradually becomes less until, immediately after the aforesaid locking of the ring 37, this engagement is broken. The cocking lever 3, now free of the locking due to the latch pawl 6, is caused by the torque of its own spring 4 to begin a rapid rotation in the counterclockwise direction about the optical axis.

The mechanical condition at this time is shown in FIG. 3. Since the pinion 14 is meshed with the gear teeth 3b at this time, it rotates in the clockwise direction about its shaft 15 in accordance with the rotation of the cocking lever 3. However, since the master member 16 is locked by the latching member 18, it is maintained in its charged condition. At the final stage of its return movement, the cocking lever 3, through the pin 21, pushes one end 18a of the latching member 18, which is thereby caused to rotate in the clockwise direction about the pivot screw 19. Accordingly, the lug portion 18b separates toward the outer periphery of the rising portion 16a of the master member 16, which is thereby unlocked. At this time when the latching member 18 unlocks the master member 16, the cocking lever 3 is stopped by a stopper (not shown).

The exposure operation is thus started. The cocking lever 3, however, does not have merely the function of unlatching the latching member 18 from the master member 16. It will be obvious that, in actual practice, the function of the cocking lever 3 is so distributed that, prior to the beginning of the exposure operation, it performs a number of functions required by the shutter. For example, during its return movement, the cocking lever 3 causes movements of such mechanisms as a delaying mechanism for an M-class flash bulb, a contact mechanism for the same purpose, or a self-timer, after which it unlatches the latching member 18 from the master member 16.

Upon being unlatched, the master member 16 is caused, by the torque due to its own spring 17, to begin a rapid rotation about the shaft 15 in the clockwise direction. The arm 16b of the master member 16 contacts and pushes the arm 24a of the intermediate lever 24, which is thereby caused to rotate about the shaft 26 in the counterclockwise direction and, through its arm 24b, pushes the stud 28 embedded in the opening and closing ring 27 for the shutter blades, thereby rotating the said ring 27 in the clockwise direction and moving the shutter blades (not shown) toward their opened condition.

After completely opening the shutter blades, the master member 16 is interrelated with a governor for controlling the exposure time or shutter speed and then, subsequently, enters the operational step of closing the shutter blades once more. In this operational step, the arm 16b of the master member 16 directly pushes the stud 29 embedded in the opening and closing ring 27, thereby causing the ring 27 to rotate about the optical axis in the counterclockwise direction, and moving the shutter blades (not shown) toward their closed condition. In pushing the stud 29, the arm 16b first contacts the stud 29 with its root portion, and the contact point moves toward the outer periphery as the rotation of the master member 16 progresses. Finally, the stud 29 slides onto the portion of equal radii of the arm 16b. In this condition, the stud 29, and therefore the ring 27, will not move further, even if the master member 16 rotates further.

Under this condition, since the stud 29 is being pushed by the arm 16b, the ring 27 will not cause the shutter blades to be reopened, even if it rebounds. By utilizing the final stage of the movement of the master member 16 under this condition, the screening blades 39 are also closed. More specifically, at the said stage, the pin 44 embedded in the master member 16 just contacts the surface 41b of the latching means 41, and as the pin 44 pushes this surface, it causes the latching means 41 to rotate about its shaft 43 in the counterclockwise direction. Thus, the extreme end 41a of the latching means 41 is caused to disengage from the notch 37c of the opening and closing ring 37 which has been maintaining the screening blades 39 in their opened condition, and the ring 37 is caused, by the torque due to the spring 33, to rotate about the optical axis in the counterclockwise direction, whereby the screening blades 39 are closed. At this time, the spring 33 simultaneously causes the transmitting lever 30 and the opening and closing lever 32 to return to their original positions (shown in FIG. 1).

As can be seen from the above description, since the movement of the screening blades 39 and the movement of the shutter blades are not effected simultaneously in a parallel manner, such movements have no effect whatsoever on the original shutter speed. Furthermore, in the case wherein exposure at a high shutter speed is to be performed, the shutter of the embodiment of the present invention may undergo an operation which differs from that described above. That is, in such cases as when the shutter completes its opening and closing operation before the operator's hand is removed from the release lever 9, the screening blades do not close even when the shutter has completed its entire operation and close only when the hand is removed from the release lever 9. The reason for this operational result is that, even when the latching means 41 releases the opening and closing ring 37, the release lever 9 is still holding, by way of the transmitting lever 30 and the opening and closing lever 32, the opening and closing ring 37 in the opened condition. This applies also to the case of bulb exposure.

In the condition wherein shutter cocking has not been carried out in the shutter of the embodiment, if the release lever is manipulated, the screening blades will accordingly undergo opening and closing operation, which, in actual practice, will have almost no detrimental effect in the attainment of the objects of the present invention. If, however, even this operation is not desired, a safety device may be installed, in accordance with the necessity, between the cocking lever 3 and the release lever 9 in such a manner that, when the cocking lever 3 is not cocked, the release lever 9 cannot be pressed. For the incorporation of this feature, various known methods are available, but since such methods have no direct relation to the present invention, detailed description and illustration thereof will be omitted here.

By the above-described construction, the lens shutter of the present invention fully achieves the stated objects and accompanying advantages. In a lens shutter according to the invention, except during the time interval in which the shutter is undergoing opening and closing operation for exposure, light rays which constantly pass through the lenses and tend to infiltrate past the shutter are shut off in a near-perfect manner by the double screening afforded by the shutter blades and the screening blades. Furthermore, all of the mechanisms are internally installed within the shutter assembly, and additional mechanisms on the exterior of the shutter assembly and manipulation thereof are unnecessary. Moreover, since the operation of the shutter blades and the operation of the screening blades do not occur simultaneously, the relation wherein the shutter blades are opened after the screening blades have been opened, and the screening blades are closed after the shutter blades have been closed, being always maintained, such operations have no influence whatsoever on the shutter speed.

Since it is obvious that many changes and modifica-

What is claimed is:

A lens shutter for photographic cameras which comprises, in combination, a set of shutter blades for effecting ordinary exposure operation by opening and closing said shutter blades, a main spring constituting a power source for said exposure operation, a setting ring provided at its outer periphery with teeth and arranged so as to be rotated around the optical axis to charge said main spring, a latching pawl for holding said setting ring at its set position, a shutter release lever having an arm and being adapted to disengage said latching pawl, a master member including said main spring to operate said shutter blades for exposure, thus carrying out exposure operation, a set of screening blades consisting of five blades installed independently of and separately from said shutter blades and used for the purpose of shutting off the light rays tending to infiltrate through the shutter blades even when the shutter is closed, a ring-shaped flat control member for controlling said screening blades, said control member having a notch at its outer periphery and five recesses of T-form spaced uniformly about said control member, said ring-shaped flat control member having an additional function as a partition wall between the space for the movement of the shutter blades and the space for the movement of said screening blades, a stud embedded in each of said screening blades adapted to operate said screening blades, each said stud engaging in one of the T-form recesses of said control member, a second pawl adapted to engage with said notch in the periphery of said control member to maintain said screening blades in their fully opened positions, said master member releasing said second pawl upon the completion of the exposure operation by said master member, said shutter release lever both releasing the latching pawl of said setting ring and operating said screening blades, an intermediate member engaged by said release lever adapted to rotate said control member to open said screening blades at the initiation of the release of the latching pawl and then to complete the release of said shutter after said control member has been latched in position with the screening blades open, an arm on said intermediate member adapted to coact with the arm of said release lever so that when said release lever moves further after said screening blades have been opened said screening blades do not open further, and a spring acting in a direction to close said screening blades and tending to return said intermediate member to its initial position.

References Cited by the Examiner

UNITED STATES PATENTS

| | | | |
|---|---|---|---|
| 2,231,094 | 2/41 | Seifert | 95—63 |
| 2,232,969 | 2/41 | Ranft | 95—63 |
| 2,625,088 | 1/53 | Fuerst | 95—63 |
| 2,772,614 | 12/56 | Rentschler | 95—63 X |
| 2,838,983 | 6/58 | Burger | 95—63 X |

FOREIGN PATENTS

| | | |
|---|---|---|
| 218,653 | 4/42 | Switzerland. |
| 222,270 | 10/42 | Switzerland. |

NORTON ANSHER, *Primary Examiner.*

JOHN M. HORAN, *Examiner.*